United States Patent
Cocuzza et al.

(10) Patent No.: US 10,169,963 B2
(45) Date of Patent: *Jan. 1, 2019

(54) WEARABLE DEVICE THAT WARMS AND/OR COOLS TO NOTIFY A USER

(71) Applicant: International Business Machines Corporation, Armonk, NY (US)

(72) Inventors: Anthony M. Cocuzza, Poughkeepsie, NY (US); Michael D. Essenmacher, Danbury, CT (US); Nancy S. Tilley, High Falls, NY (US); Janice M. Young, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,605

(22) Filed: Mar. 6, 2018

(65) Prior Publication Data
US 2018/0197386 A1    Jul. 12, 2018

Related U.S. Application Data

(63) Continuation of application No. 14/727,922, filed on Jun. 2, 2015, now Pat. No. 9,947,185, which is a continuation of application No. 14/681,235, filed on Apr. 8, 2015, now Pat. No. 9,972,174.

(51) Int. Cl.
*G08B 6/00* (2006.01)
*G05D 23/22* (2006.01)

(52) U.S. Cl.
CPC ............... *G08B 6/00* (2013.01); *G05D 23/22* (2013.01)

(58) Field of Classification Search
CPC ......... G06F 3/016; G06F 3/0412; G08B 6/00; G05D 23/22
See application file for complete search history.

(56) References Cited

U.S. PATENT DOCUMENTS

| | | |
|---|---|---|
| 6,344,795 B1 | 2/2002 | Gehlot |
| 7,378,939 B2 | 5/2008 | Sengupta et al. |
| 8,107,920 B2 | 1/2012 | Ben Ayed |
| 8,238,869 B2 | 8/2012 | Brayton |

(Continued)

FOREIGN PATENT DOCUMENTS

| | | |
|---|---|---|
| CN | 1556591 A | 12/2004 |
| CN | 101890719 A | 11/2010 |

(Continued)

OTHER PUBLICATIONS

Appendix P List of IBM Applications or Patents Treated as Related. Dated Mar. 5, 2018. Two pages.

(Continued)

*Primary Examiner* — James J Yang
*Assistant Examiner* — Kevin Lau
(74) *Attorney, Agent, or Firm* — Stephen R. Yoder (57) ABSTRACT

A wearable device that warms or cools to notify a user wearing the device is provided. The wearable device includes: a plurality of individual heating and/or cooling spots, a plurality of dots pulsating in heating/cooling sections, and/or a plurality of dots moving around in heating/cooling sections. A system is also provided comprising a wearable device, a scheduling device, and a communication between the wearable device and the scheduling device.

15 Claims, 5 Drawing Sheets

(56) References Cited

U.S. PATENT DOCUMENTS

| 8,676,168 B2 | 3/2014 | Storozuk |
| 2005/0272408 A1 | 12/2005 | Wilkes-Gibbs et al. |
| 2009/0238345 A1 | 9/2009 | Cha |
| 2010/0109918 A1 | 5/2010 | Liebermann |
| 2010/0210313 A1 | 8/2010 | Huang et al. |
| 2011/0210931 A1 | 9/2011 | Shai |
| 2012/0218184 A1 | 8/2012 | Wissmar |
| 2013/0135214 A1 | 5/2013 | Li et al. |
| 2013/0222565 A1 | 8/2013 | Guerin et al. |
| 2014/0274010 A1 | 9/2014 | Cavallaro et al. |
| 2015/0123775 A1* | 5/2015 | Kerdemelidis .......... G08B 6/00 340/407.1 |
| 2015/0277563 A1 | 10/2015 | Huang et al. |
| 2015/0309535 A1 | 10/2015 | Connor |
| 2016/0300461 A1 | 10/2016 | Cocuzza et al. |
| 2016/0300462 A1 | 10/2016 | Cocuzza et al. |

FOREIGN PATENT DOCUMENTS

| CN | 102318326 A | 1/2012 |
| CN | 104090601 A | 10/2014 |
| CN | 104460979 A | 3/2015 |
| CN | 106055086 A | 10/2016 |
| WO | 0199450 A2 | 12/2001 |

OTHER PUBLICATIONS

"Understanding Thermoelectric Cooling", Active Cool, dated Apr. 11, 2014, pp. 1-3. <https://www.activecool.com/technotes/thermoelectric.html>.

"A touchscreen with keys that rise and disappear", CNN.com, Updated Wed Jun. 6, 2012, pp. 1-2. <https://www.cnn.com/2012/06/06/tech/a-touchscreen-with-keys-that-rise-and-disappear/index.html>.

Yamamato "Human Interface and the Management of Information" Jun. 22-27, 2014. Springer.

Hansson et al., "The Reminder Bracelet: Subtle Notification Cues for Mobile Devices", CHI 2000, Student Posters, Apr. 1-6, 2000, © Copyright on this material is held by the author(s), pp. 323-324.

Kee, Edwin, "Bradley Timepiece Specially Designed for the Blind", Ubergizmo, Apr. 8, 2014, pp. 1-2.<http://www.ubergizmo.com/2014/04/bradley-timepiece-specially-designed-for-the-blind/.

Kern et al., "Context-Aware Notification for Wearable Computing", Proceedings of the Seventh IEEE International Symposium on Wearable Computers (ISWC'03), pp. 1-8, © 2003 IEEE.

Maurer et al., "eWatch: A Wearable Sensor and Notification Platform", Proceedings of the International Workshop on Wearable and Implantable Body Sensor Networks (BSN'06), pp. 1-4, © 2006 IEEE.

* cited by examiner

FIG. 9

WEARABLE DEVICE THAT WARMS AND/OR COOLS TO NOTIFY A USER

FIELD OF THE INVENTION

The present invention relates generally to the field of wearable technology, and more particularly to a wearable device that warms or cools to notify a user.

BACKGROUND OF THE INVENTION

Wearable devices are typically a category of technology devices that can be worn by a consumer and often include tracking information related to health and fitness. Other wearable technology devices include devices that have small motion sensors to take photos and sync with mobile devices. Exemplary forms of typical wearable devices include: badges, wristbands, and/or eyeglasses. In addition to typical wearable devices, the term "wearable device," as used herein, may refer to devices having a size and configuration such that they may be held in the hand, sewn into an article of clothing, or placed into a pocket of a shirt or pair of pants.

Wearable devices have applications, such as in healthcare and in monitoring and real time feedback for athletes. Wearable devices could be useful in professional and/or medical patient settings. For example, making payment easier, improving customer experience, and enhancing data analytics.

The Peltier effect is demonstrated when an electric current crosses a junction of two dissimilar conductors, a thermocouple, there is a heating effect that is not explained entirely by Joule heating. Further, depending on the direction of the current, the overall effect of the current may be either heating or cooling. This heating and cooling effect can be harnessed to create a heater or a cooler, also referred to as a thermoelectric heat pump.

SUMMARY

According to an aspect of the present invention, there is a computer-implemented method, computer system, and a computer program product including a process comprising: (i) monitoring for an alert condition being met, the alert condition having a corresponding alert type; (ii) responsive to the alert condition being met, communicating the corresponding alert type by taking a first alert action, the first alert action being selectively applying a temperature change to at least one of a first pre-defined quadrant of a wearable device and a second pre-defined quadrant of the wearable device; and (iii) responsive to the alert condition being met, communicating the corresponding alert type by taking a second alert action, the second alert action being selectively pulsating at least one mechanical bump within one of a plurality of pre-defined quadrants on the wearable device, the mechanical bump protruding from the wearable device and having a size to ensure contact with a portion of the outer surface of the user. The first alert action is generated by a thermocouple. Two pre-defined quadrants of the plurality of pre-defined quadrants are divided by a first edge, a temperature of the first edge being adjustable by the thermocouple according to the first alert action. The temperature is distinct from the temperature change of the first pre-defined quadrant of the wearable device and/or the second pre-defined quadrant of the wearable device.

DETAILED DESCRIPTION

Conventionally, portable and/or wearable devices have three alerting options: (i) by sound; (ii) by vibration; and/or (iii) silent alert. When a user is alerted by sound or vibration, it is not a discrete alert as everyone in the room can hear the device go off. This can be both an annoyance to the people in the room and a lack of privacy to the person with the device. For the silent alert, the user runs the risk of not knowing an alert arrived. It is desired that a user could be discretely alerted about something on their portable device without the device alerting others.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
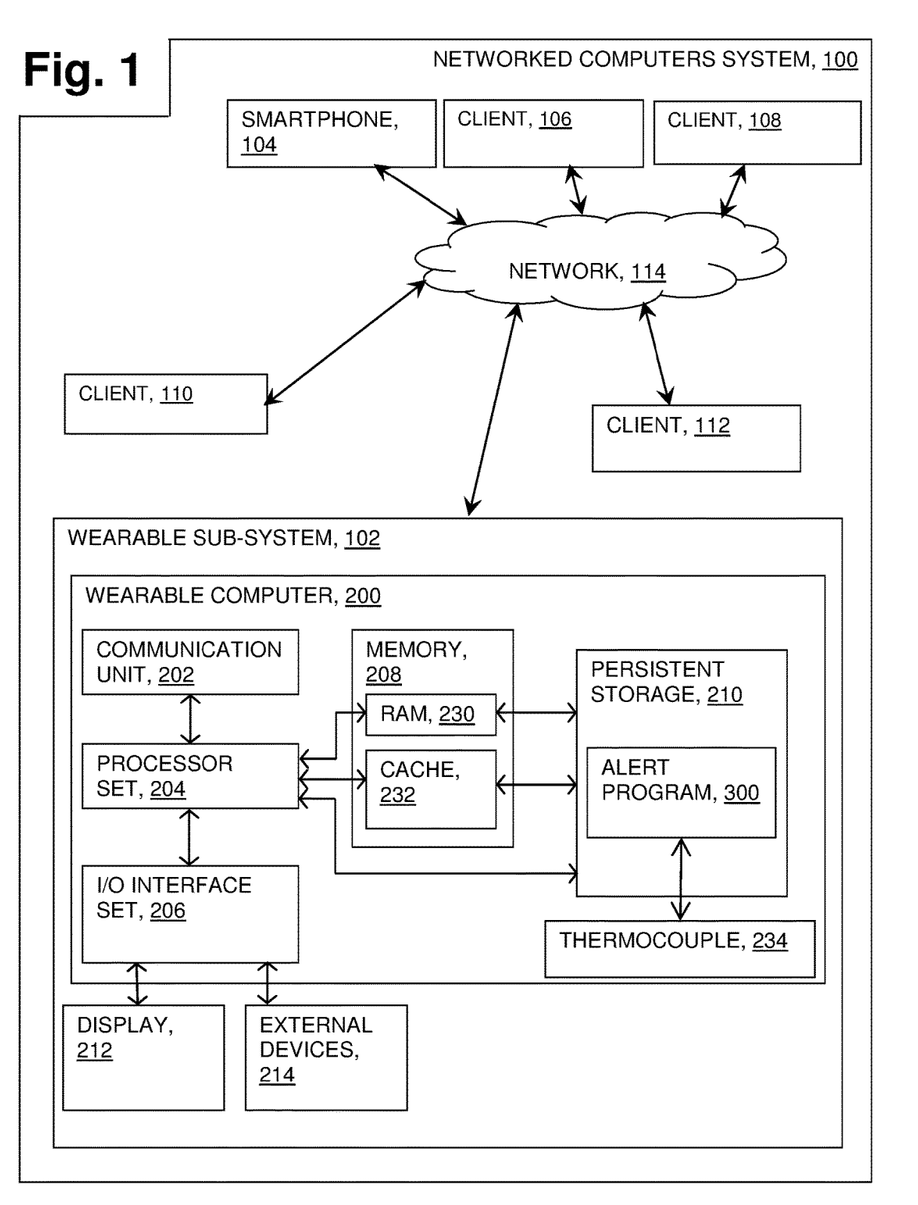
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: wearable sub-system 102; client sub-systems 104, 106, 108, 110, 112; communication network 114; wearable computer 200; communication unit 202; processor set 204; input/output (I/O) interface set 206; memory device 208; persistent storage device 210; display device 212; external device set 214; random access memory (RAM) devices 230; cache memory device 232; thermocouple(s) set 234; and alert program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Some embodiments of the present invention provide a wearable device that gets warm or cold to notify a user wearing the device of a reminder or detected event. Examples of such device include watch, wristband, and/or ring. The reminders or events include, but are not limited to, (i) radiation detection; (ii) smoke detection; (iii) natural gas detection; (iv) weather related warning (e.g. blizzard, extreme cold, and hurricane); (v) calendar event (e.g., doctor appointment); (vi) phone call notification; (vii) wake up alarm; and/or (viii) incoming text messages.

Figure 2:
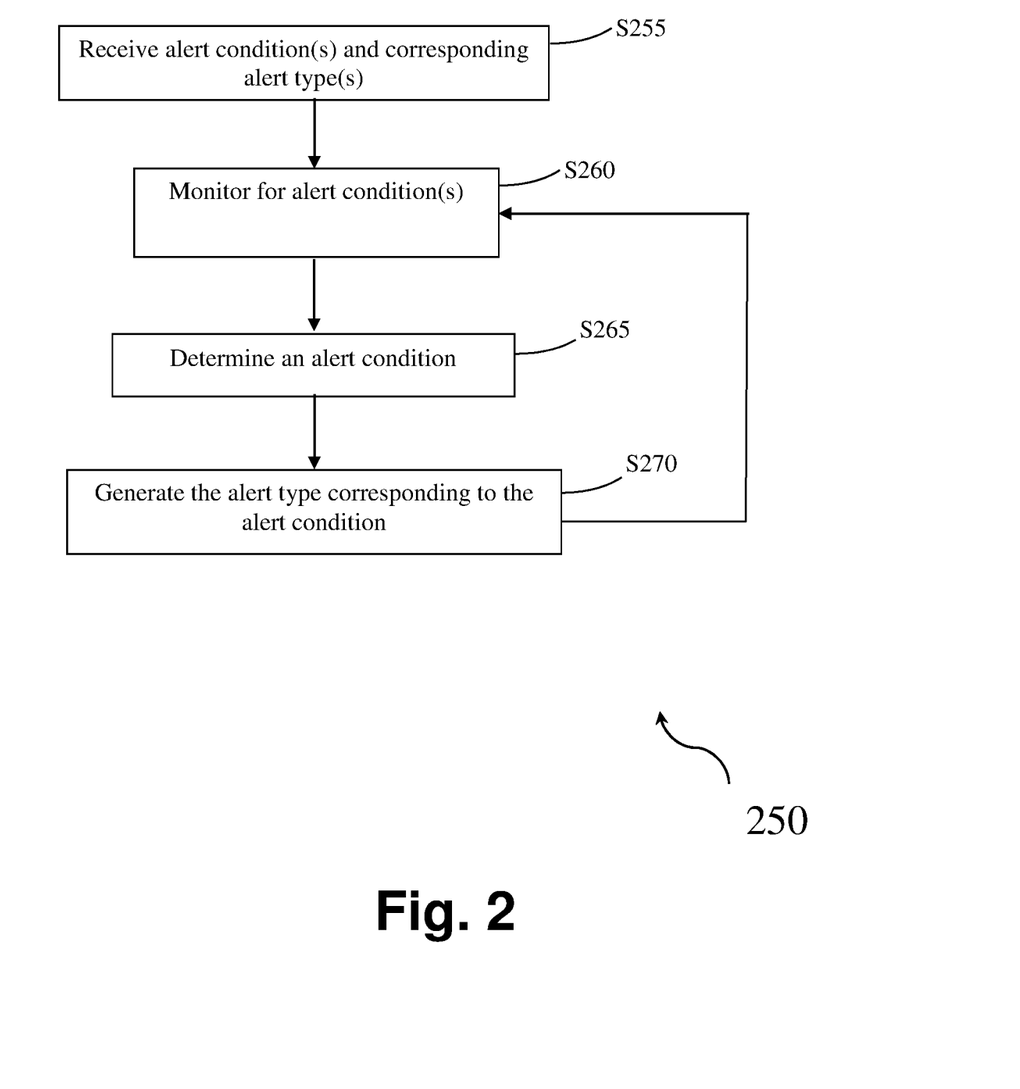
FIG. 2 is a flowchart showing a method performed, at least in part, by the first embodiment system.
Figure 3:
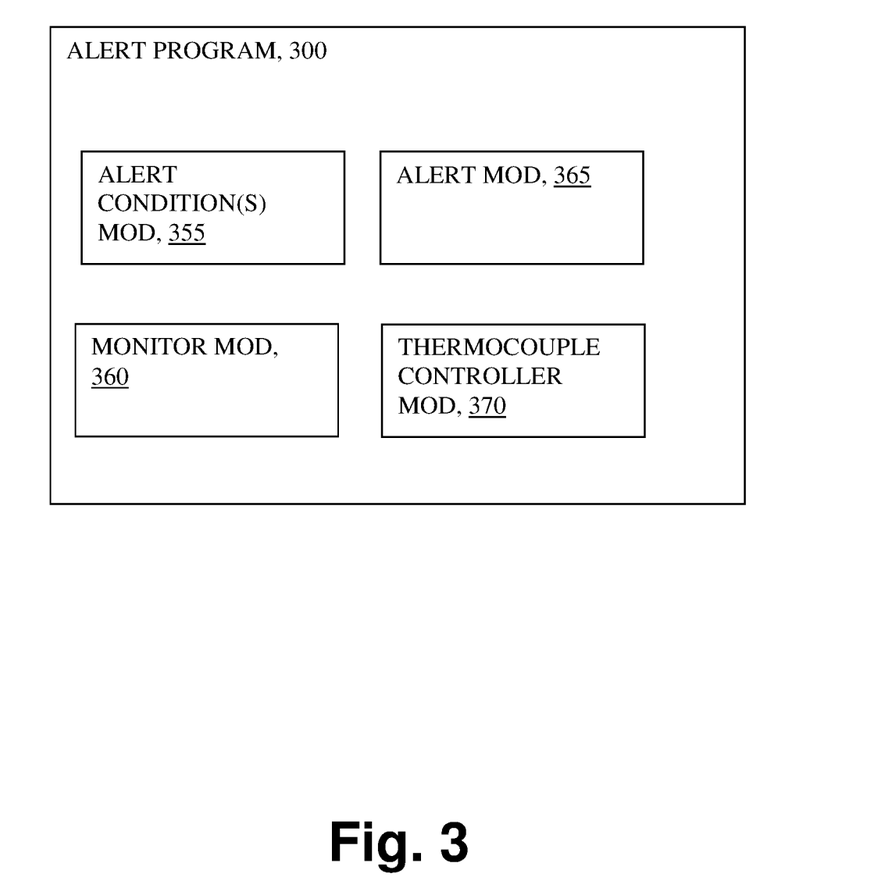
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where alert conditions module "mod" 355 receives alert condition(s) and corresponding alert type(s). In this example, the alert condition(s) mod receives alert conditions input by the user via external device(s) set 214 (FIG. 1). Alternatively, the wearable sub-system does not include a user input device or a display, such as display 212 (FIG. 1), but communicates with a client sub-system, such as smartphone 104 (FIG. 1) to receive alert conditions and corresponding alert types. Alternatively, alert program 300 is stored on a client device that communicates with wearable sub-system to operate thermocouple(s) set 234 (FIG. 1).

In this example, an alert condition is the event for which an alert is desired, whether the event is the arrival of a specified hour of the day or the detection of a harmful environmental condition. Examples of events are discussed in more detail elsewhere in this detailed description. An alert type is the location and/or degree of heat or cold that will indicate the corresponding alert condition. In this example, the alert condition is the arrival of a specified meeting time and the alert type is that the user's cell phone becomes cool to the touch. Alternatively, the user wears a ring-like device on a finger. The alert condition is determined by client device 104 (FIG. 1) and the client device instructs the thermocouple of the ring-like device to produce a cooling effect. It should be noted that a wearable device is not necessarily a device that is typically worn by a user, but may be any alerting device that a user holds in a hand, stitches into clothing, or inserts into a shoe.

Processing proceeds to step S260, where monitor mod 360 monitors for an alert condition specified in step S255. In this example, the step of monitoring is an ongoing activity that is initiated and terminated by a user. Alternatively, the step of monitoring is continuous. Alternatively, the step of monitoring begins with the act of wearing the device, via a motion sensor or optical sensor (not shown).

Processing proceeds to step S265, where alert mod 365 determines that an alert condition has occurred, or is occurring. Determination of an alert condition may be based on a specialized sensor, for example, a Geiger counter. The alert condition may be determined by a software program on a client device, such as email, timer, instant messaging, and/or social media programs.

Processing proceeds to step S270, where thermocouple controller mod 370 generates the alert type corresponding to the alert condition. In this example, cooling temperatures are generated to cool the cell phone when alert mod 365 determines, in step S265, that the specified meeting time has arrived. As discussed above, in this example, the user's cell phone is effectively illustrated as wearable sub-system 102 (see FIG. 1). Alternatively, any part, or all, of alert program 300 is contained in a client device. The client device, then communicates, via network 114, with wearable sub-system 102 to alert, as appropriate, via thermocouple 234.

As shown in FIG. 2, processing returns to step S260 to continue monitoring for alert condition(s). As stated earlier, the user controls when to initiate and when to terminate the alert program. Alternatively, only one alert condition occurs before the program terminates. Alternatively, a pre-determined number of alerts will be determined before terminating the program. Alternatively, when a user ceases to "wear" the device, processing ends.

Reference will now be made in detail to some embodiments of the present invention, examples of which are illustrated in the accompanying figures. Wherever possible, the same reference numbers will be used throughout the figures to refer to the same or like parts.

Figure 4:
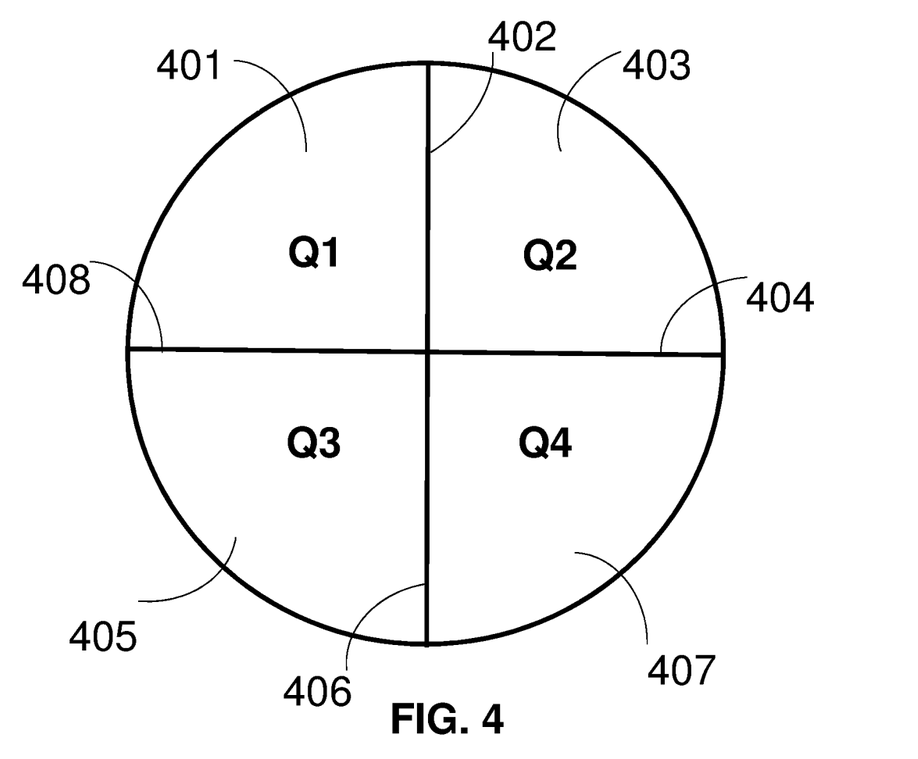
FIG. 4 illustrates an exemplary wearable device: a watch having four quadrants and four edges separating the four quadrants.

Referring to FIG. 4, illustrated is a schematic diagram of an exemplary watch according to an embodiment of the present disclosure. The watch comprises four quadrants: quadrant one 401 (e.g., from 9 o'clock to 12 o'clock), quadrant two 403 (e.g., from 12 o'clock to 3 o'clock), quadrant three 405 (e.g., from 6 o'clock to 9 o'clock), and quadrant four 407 (e.g., from 3 o'clock to 6 o'clock); as well as four edges separating the four quadrants: edge one 402 (i.e., the 12 o'clock boundary) dividing quadrant one 401 and quadrant two 403, edge two 404 (i.e., the 3 o'clock boundary) dividing quadrant two 403 and quadrant four 407, edge three 406 (i.e., the 6 o'clock boundary) dividing quadrant four 407 and quadrant three 405, and edge four 408 (i.e., the 9 o'clock boundary) dividing quadrant three 405 and quadrant one 401.

In some embodiments of the present invention, there are eight individual spots in a watch that can be heated and/or cooled: inside the four quadrants and the four edges dividing the four quadrants. In this exemplary embodiment, heating elements such as thermocouples are used to heat or cool the eight individual spots. A thermocouple can easily be heated and cooled in a 40 degree Celsius temperature differential, which can be achieved quickly with just a boost in electric current. Such an exemplary thermocouple utilizes a thermoelectric effect, thus, depending on the direction of electric current, the overall effect could be either heating or cooling, which can be harnessed to transfer heat, creating a heater or a cooler.

Generally, a 40 degree Celsius temperature differential would burn or freeze a person's skin, thus, in this exemplary embodiment, such extreme is not needed. A person's skin temperature is normally between 34 degrees Celsius and 37 degrees Celsius (i.e., 93 degrees Fahrenheit and 97 degrees Fahrenheit). In this example, thermocouples start at 35 degrees Celsius to mimic a person's skin temperature. To feel a temperature difference for a user wearing the watch, the temperature usually changes 10 degrees Celsius (about 20 degrees Fahrenheit) in either direction (i.e., warm or cool). Therefore, a quadrant is heated or cooled to a temperature anywhere between 25 degrees Celsius and 45 degrees Celsius.

If two edges of a quadrant is set to be one temperature (e.g., 25 degrees Celsius) and the middle of the quadrant is set to be another temperature (e.g., 45 degrees Celsius), this temperature difference can create a sensation that alerts a user wearing the watch. Alternatively, this effect can be toggled across quadrants to create different alerts, for example, moving from 12 o'clock to 3 o'clock and then going from 3 o'clock to 6 o'clock and then back to 12 o'clock to 3 o'clock.

In some embodiments of the present invention, the correspondence between a temperature sensation and an alert is selectable by a user wearing the device. For example, a user may correspond a received email to a warm sensation, while another user may correspond a received email to a cool sensation. Alternatively, some users may prefer no heating or cooling, but a pulsing mechanism instead when the temperature sensation toggles among the quadrants.

In some embodiments of the present invention, to further enhance the temperature sensation and to ensure the wearable makes contact with a user's skin, the wearable device can expand until it makes contact with the user's skin. This can be achieved in a plurality of ways. In one embodiment, an entire quadrant of a watch can expand and touch a user's skin, such that both the cold areas and the warm wedge in between press against the user's skin.

Figure 5:
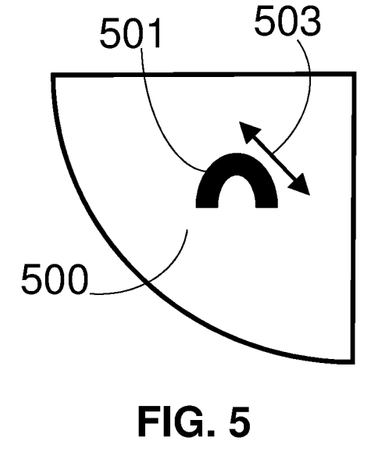
FIG. 5 illustrates an exemplary enhancement over a temperature sensation for the watch: a dot pulsating inside a quadrant of the watch.
Figure 6:
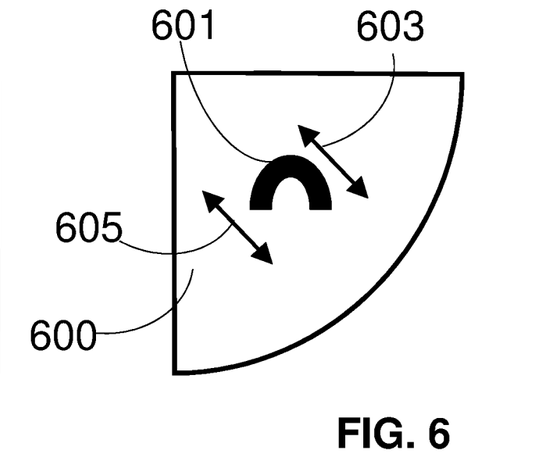
FIG. 6 illustrates another exemplary enhancement over a temperature sensation of the watch: a dot moving around inside a quadrant of the watch.

Alternatively, there can be a single point of contact, for example, a dot in the middle of a warm (or cool) section that pulsates in and out to enhance the temperature sensation, as shown in FIG. 5 where dot 501 in the middle of quadrant 500 pulsates around indicated by double arrow head 503. Alternatively, there can be a dot that moves around inside a warm (or cool) section of a quadrant of a watch to create a different alerting sensation or to enhance a temperature sensation, as shown in FIG. 6 where dot 601 inside quadrant 600 moves around indicated by double arrow head 603 and double arrow head 605. Alternatively, the dots can have variable speeds and pressures to denote urgency. For example, a fast pulsating or moving dot indicates a high urgent alert requiring the user to deal with immediately. The above enhancements over the temperature sensation allow a device to save on energy due to not raising or lowering the temperature drastically for a user to feel the sensation.

Figure 7:
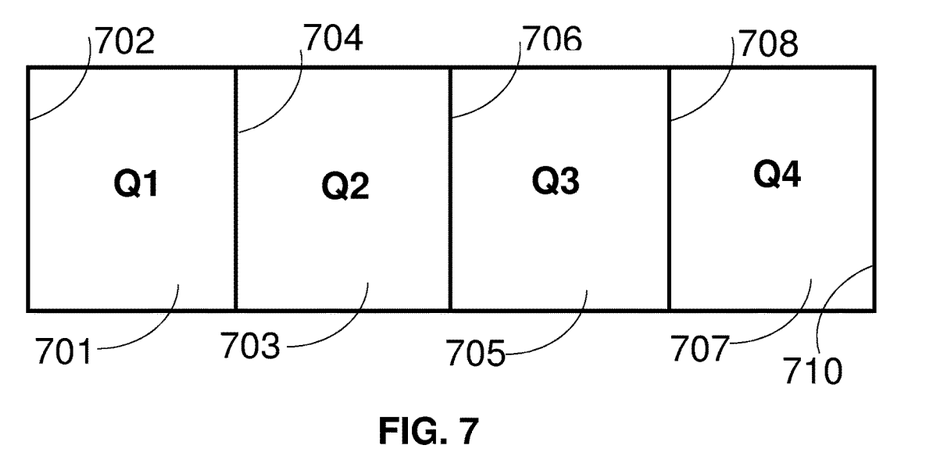
FIG. 7 illustrates another exemplary wearable device: a bracelet or a ring having four quadrants and five edges separating the four quadrants.

The above description is not only applicable to watches, but also anything that can be worn and broke into sections, such as rings and bracelets. FIG. 7 depicts a schematic diagram of a bracelet (or a ring) that is broken into four quadrants: quadrant one 701, quadrant two 703, quadrant three 705, and quadrant four 707. The four quadrants are divided by five edges: edge one 702, edge two 704, edge three 706, edge four 708, and edge five 710. The four quadrants and five edges can be heated or cooled individually, i.e., there are nine heating or cooling spots.

As the watch described above, the quadrants and their edges for the bracelet or ring touch a wearer on the skin side. The difference in temperature between each of the different quadrants and their edges provide significant temperature sensations. The quadrants include the ability to expand to increase contact with a user's skin while being heated or cooled. Additional points of skin contact are included, like dots in the middle of a quadrants that pulsate, move around, and vary in both speed and pressure as well.

Figure 8:
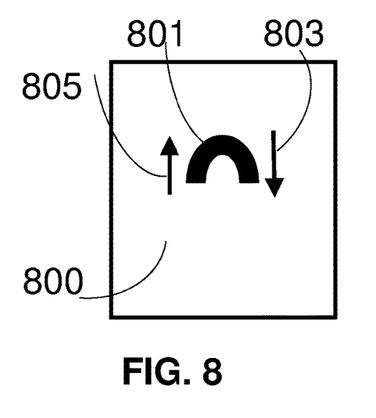
FIG. 8 illustrates an exemplary enhancement over a temperature sensation of the bracelet or the ring: a dot pulsating inside a quadrant of the bracelet or the ring.
Figure 9:
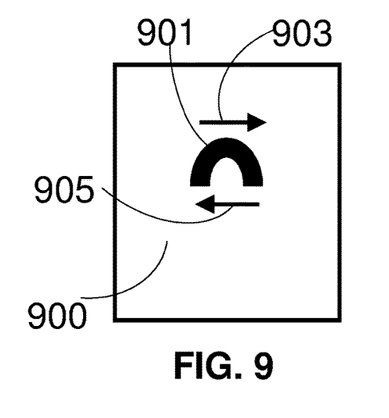
FIG. 9 illustrates another exemplary enhancement over a temperature sensation of the bracelet or the ring: a dot moving around inside a quadrant of the bracelet or the ring.

FIG. 8 shows dot 801 in the middle of quadrant 800 of a bracelet or ring that pulsates around indicated by arrow head 803 and arrow head 805. Alternatively, there can be a dot that moves around inside a warm (or cool) section of a quadrant of a bracelet or a ring to create a different alerting sensation or to enhance a temperature sensation, as shown in FIG. 9 where dot 901 inside quadrant 900 moves around indicated by arrow head 903 and arrow head 905.

Some embodiments of the present invention provide a system comprising a wearable device, a scheduling device, and a communication between the wearable device and the scheduling device. The wearable devices include a watch, a bracelet or a ring that can be warmed or cooled when a notification is received. The scheduling devices include a phone or a computer on which notifications can be set up. The communication can include Bluetooth and or WiFi. (Note: the term(s) "Bluetooth" and/or "WiFi" may be subject to trademark rights in various jurisdictions throughout the world and are used here only in reference to the products or services properly denominated by the marks to the extent that such trademark rights may exist.)

A user sets up a series of notifications on a scheduling device (e.g., a phone or a computer). The setup includes what an event is, when the event occurs and whether the event corresponds to a hot sensation or a colds sensation. When the event goes off, the scheduling device sends a notification to the wearable device through the communication. Upon receiving the notification, the wearable device interprets the notification either to heat up or to cool down. When a user wearing the wearable device feels the warming or cooling sensation in the wearable device, the user knows to turn to scheduling device to check the notification.

In some embodiments, a user can have multiple wearable devices. For example, a ring device for phone calls and a bracelet device for weather related warnings. In a scenario of phone calls, a phone call comes in, but the user is in a meeting. The user's ring warms up that corresponds to a phone notification. So the user knows after the meeting is over to look at his phone or the user can look at his phone at the moment knowing something is coming in.

In a scenario where a hearing impaired person wearing a wearable device (e.g., a ring) is in the house and someone rings the doorbell, the hearing impaired person's ring warms up. So the hearing impaired person can look at his phone to see that someone is at his door. Alternatively, a notification can go to multiple wearable devices. For instance a first user and a second user can both be alerted to some event such as a doorbell or a phone call, each of them independently wearing a device such as a ring. Yet another example, two people wake up at different times of the day but share the same bed. Each person can be woken up by heating or cooling of a wearable device. The other person is not disturbed by an alarm of any sort.

Some embodiments of the present invention may include one, or more, of the following features, characteristics and/or advantages: (i) when users get alerted by the warming or cooling of a wearable device, they are the only person alerted. For example, if the users are in a meeting, they do not disrupt the meeting; if the users are in a theater, they do not disturb anyone; if the users are asleep in bed with someone else, they get woken up without the person next to them being woken up; (ii) as only one person is alerted by the device, the notification remains private; (iii) such device is useful for the hearing and visually impaired, as they do not have to rely on sight or sound to be alerted; and/or (iv) such device allows a user to be away from a computer or phone but still be notified.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
monitoring for an alert condition being met, the alert condition having a corresponding alert type;
responsive to the alert condition being met, communicating the corresponding alert type by taking a first alert action, the first alert action being selectively applying a temperature change to at least one of a first pre-defined quadrant of a wearable device and a second pre-defined quadrant of the wearable device; and
responsive to the alert condition being met, communicating the corresponding alert type by taking a second alert action, the second alert action being selectively pulsating at least one mechanical bump within one of a plurality of pre-defined quadrants on the wearable device, the mechanical bump protruding from the wearable device and having a size to ensure contact with a portion of the outer surface of the user;
wherein:
the first alert action is generated by a thermocouple;
two pre-defined quadrants of the plurality of pre-defined quadrants are divided by a first edge, a temperature of the first edge being adjustable by the thermocouple according to the first alert action; and the temperature is distinct from the temperature change of the first pre-defined quadrant of the wearable device and/or the second pre-defined quadrant of the wearable device.

2. The computer-implemented method of claim 1, further comprising:
determining the first and the second pre-defined quadrants of the wearable device associated with the corresponding alert type.

3. The computer-implemented method of claim 2, wherein the first pre-defined quadrant of the wearable device corresponds to a first alert type and the second pre-defined quadrant of the wearable device corresponds to a second alert type.

4. The computer-implemented method of claim 1, wherein the first alert action is both heating the first pre-defined quadrant of the wearable device and cooling the second pre-defined quadrant of the wearable device.

5. The computer-implemented method of claim 1, wherein the wearable device includes a wrist bracelet.

6. A computer system comprising:
a processor(s) set;
a thermocouple(s) set; and
a computer readable storage medium;
wherein:
the processor set is structured, located, connected, and/or programmed to run program instructions stored on the computer readable storage medium; and
the program instructions include:
first program instructions programmed to monitor for an alert condition being met, the alert condition having a corresponding alert type;
second program instructions programmed to, responsive to the alert condition being met, communicate the alert type by taking a first alert action, the first alert action being to selectively apply a temperature change to at least one of a first pre-defined quadrant of a wearable device and a second pre-defined quadrant of the wearable device; and
third program instructions programmed to, responsive to the alert condition being met, communicate the alert type by taking a second alert action, the second alert action being to selectively pulsate at least one mechanical bump within one of a plurality of pre-defined quadrants on the wearable device, the mechanical bump protruding from the wearable device and having a size to ensure contact with a portion of the outer surface of the user;
wherein:
the first alert action is generated by a thermocouple set;
two pre-defined quadrants of the plurality of pre-defined quadrants are divided by a first edge, a temperature of the first edge being adjustable by the thermocouple set according to the first alert action; and
the temperature is distinct from the temperature change of the first pre-defined quadrant of the wearable device and/or the second pre-defined quadrant of the wearable device.

7. The computer system of claim 6, wherein the program instructions further include:

fourth program instructions programmed to determine the first and the second pre-defined quadrants of the wearable device associated with the corresponding alert type.

8. The computer system of claim 7, wherein the first pre-defined quadrant of the wearable device corresponds to a first alert type and the second pre-defined quadrant of the wearable device corresponds to a second alert type.

9. The computer system of claim 6, wherein the first alert action is both heating the first pre-defined quadrant of the wearable device and cooling the second pre-defined quadrant of the wearable device.

10. The computer system of claim 6, wherein the wearable device is a wrist bracelet.

11. A computer program product comprising a computer-readable storage medium having a set of instructions stored therein which, when executed by a processor, causes the processor to alert a user of an event by:
monitoring for an alert condition being met, the alert condition having a corresponding alert type;
responsive to the alert condition being met, communicating the corresponding alert type by taking a first alert action, the first alert action being selectively applying a temperature change to at least one of a first pre-defined quadrant of a wearable device and a second pre-defined quadrant of the wearable device; and
responsive to the alert condition being met, communicating the corresponding alert type by taking a second alert action, the second alert action being selectively pulsating at least one mechanical bump within one of a plurality of pre-defined quadrants on the wearable device, the mechanical bump protruding from the wearable device and having a size to ensure contact with a portion of the outer surface of the user;
wherein:
the first alert action is generated by a thermocouple;
two pre-defined quadrants of the plurality of pre-defined quadrants are divided by a first edge, a temperature of the first edge being adjustable by the thermocouple according to the first alert action; and
the temperature is distinct from the temperature change of the first pre-defined quadrant of the wearable device and/or the second pre-defined quadrant of the wearable device.

12. The computer program product of claim 11, further causing the processor to alert a user of an event by:
determining the first and the second pre-defined quadrants of the wearable device associated with the corresponding alert type.

13. The computer program product of claim 12, wherein the first pre-defined quadrant of the wearable device corresponds to a first alert type and the second pre-defined quadrant of the wearable device corresponds to a second alert type.

14. The computer program product of claim 11, wherein the first alert action is both heating the first pre-defined quadrant of the wearable device and cooling the second pre-defined quadrant of the wearable device.

15. The computer program product of claim 11, wherein the wearable device includes a wrist bracelet.

* * * * *